March 31, 1936.   B. W. FREEMAN   2,035,956
ORNAMENTING MACHINE
Filed March 8, 1934   5 Sheets-Sheet 5
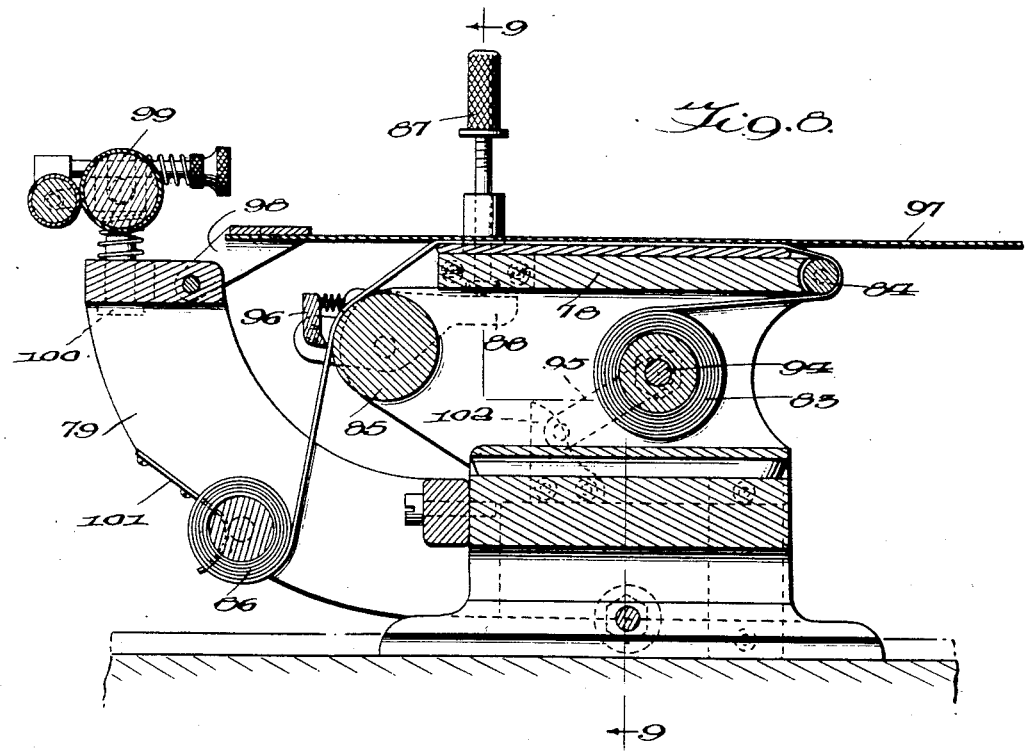
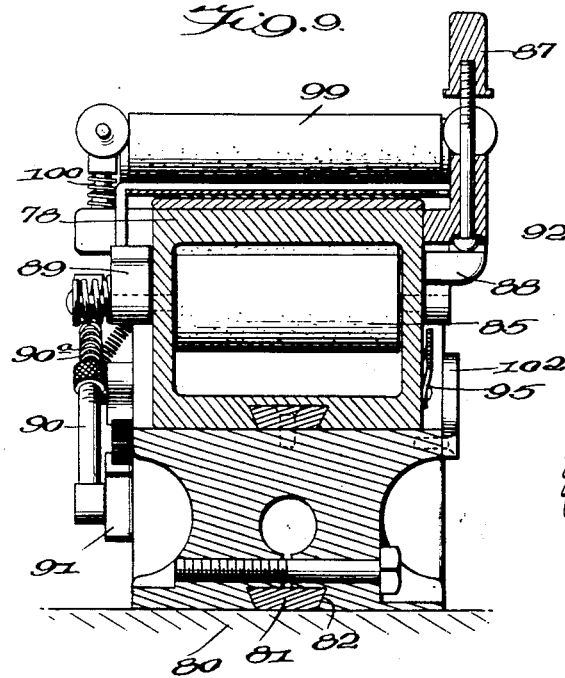
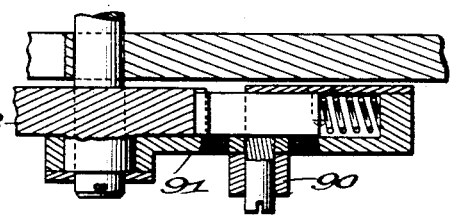
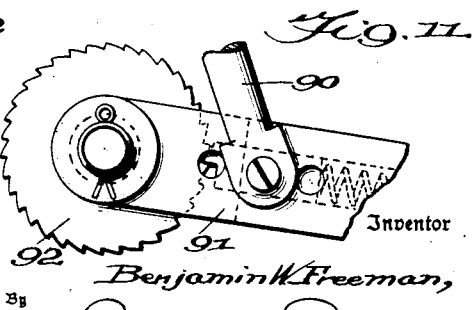

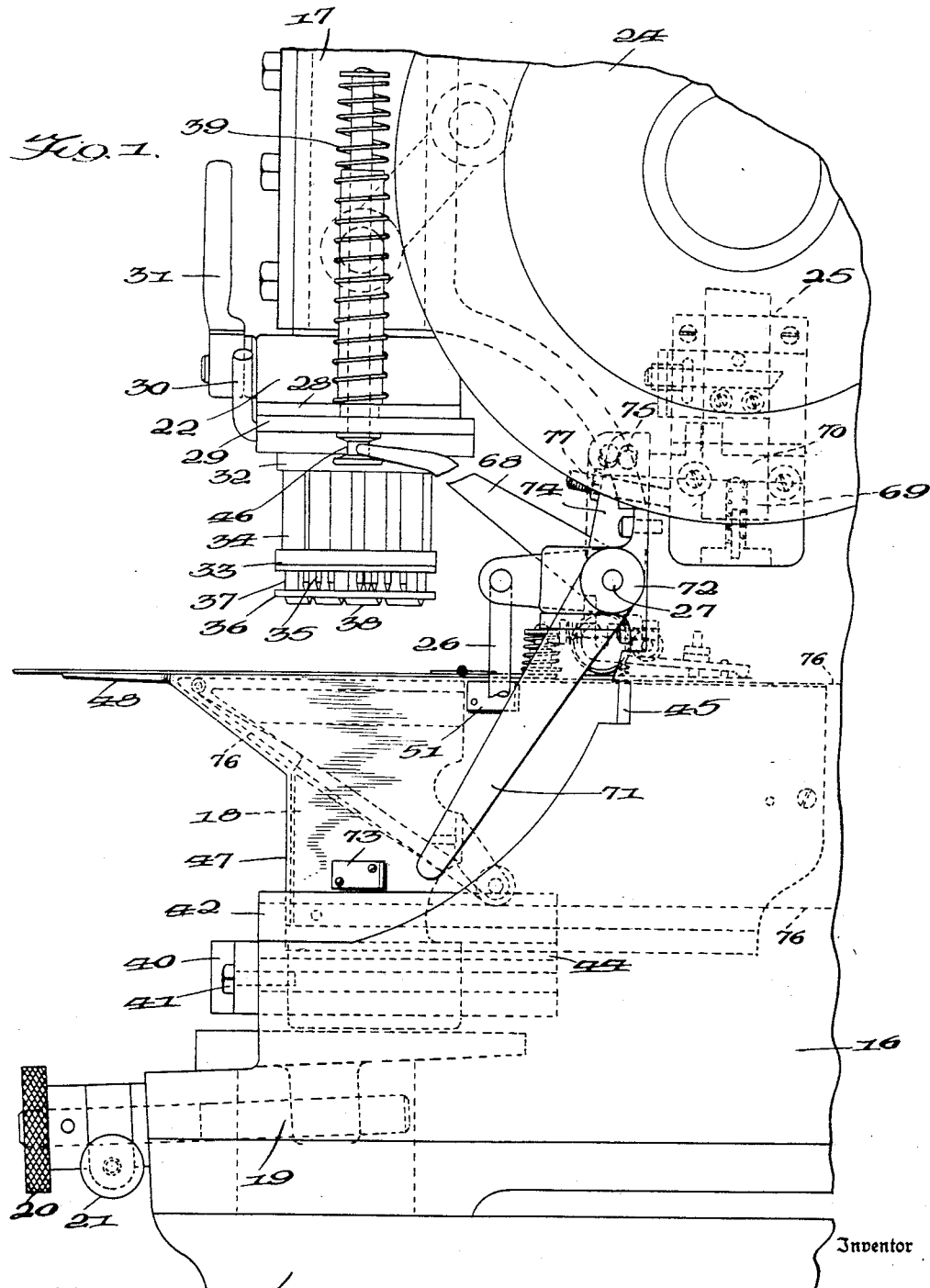

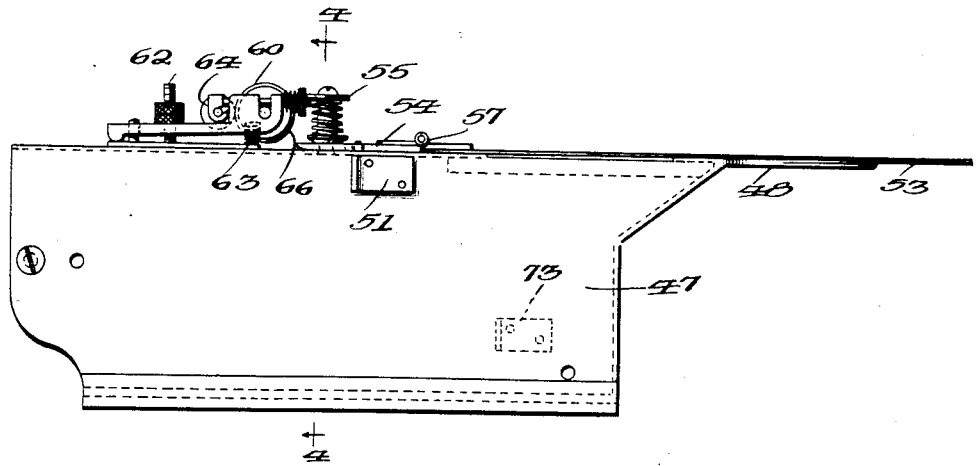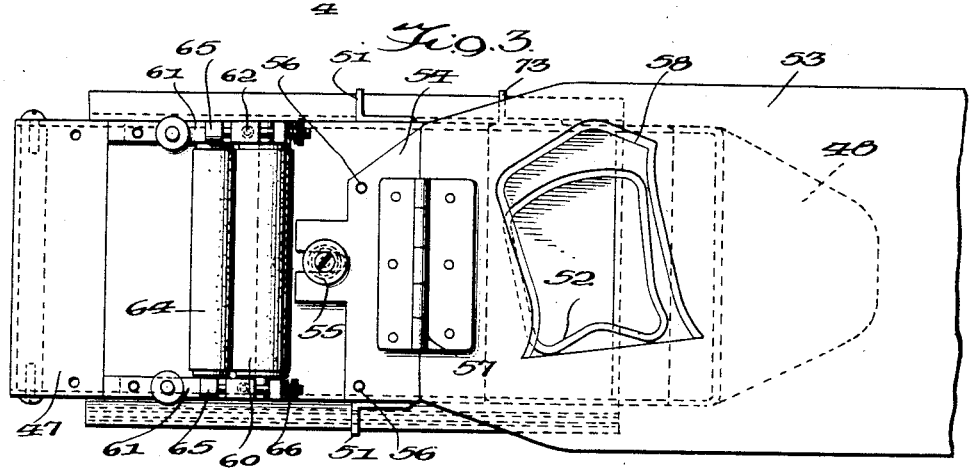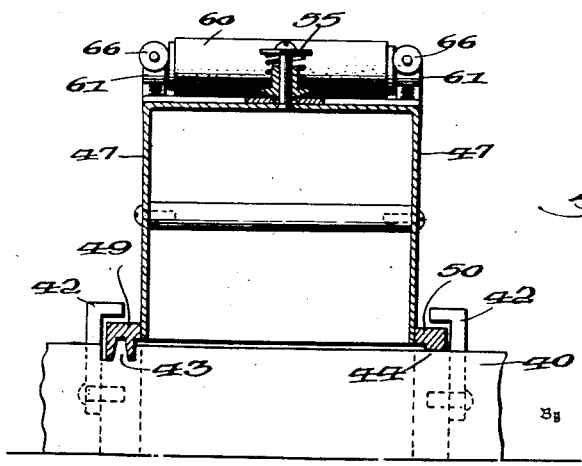

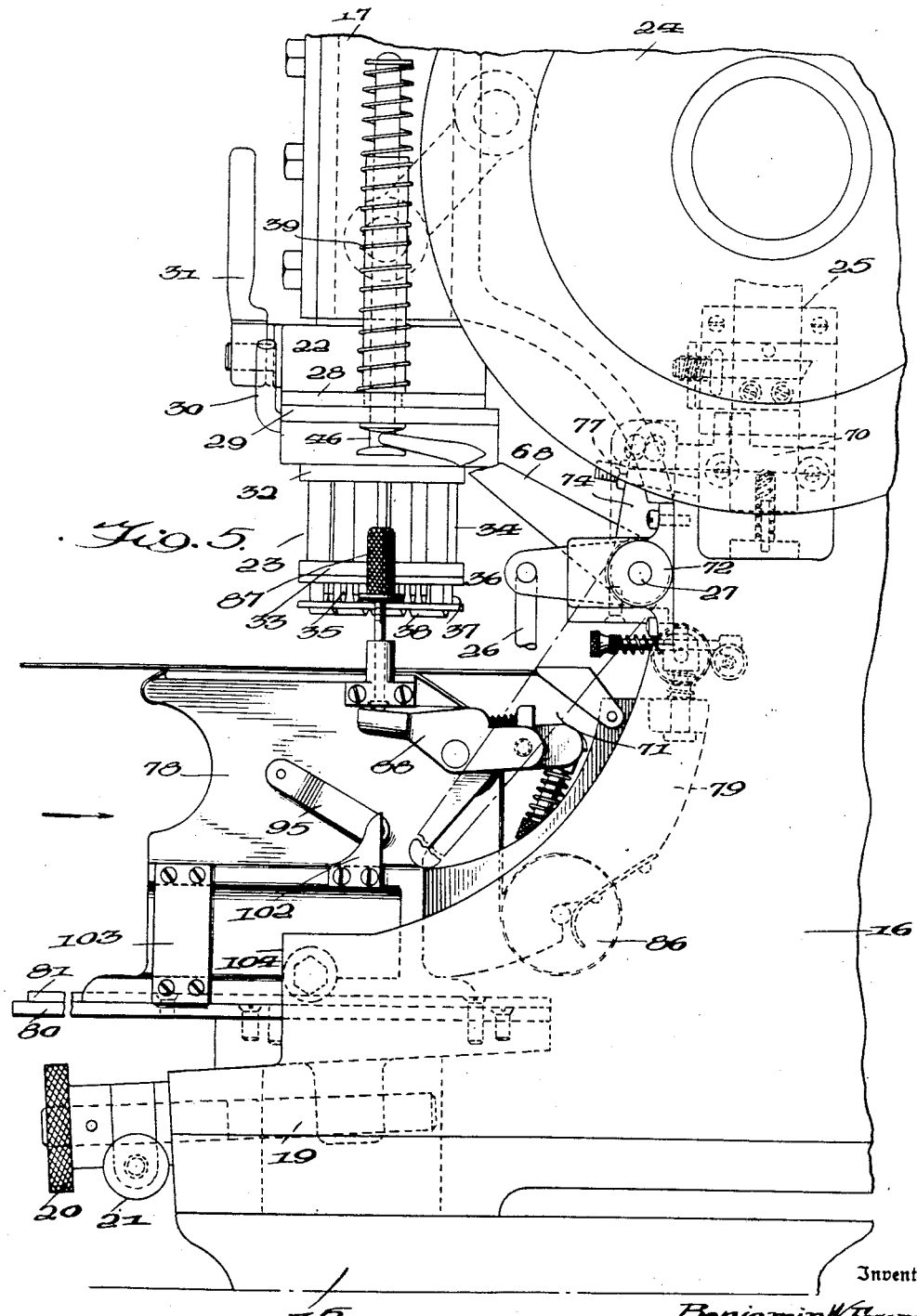

Patented Mar. 31, 1936

2,035,956

UNITED STATES PATENT OFFICE 2,035,956

ORNAMENTING MACHINE

Benjamin W. Freeman, Cincinnati, Ohio

Application March 8, 1934, Serial No. 714,726

28 Claims. (Cl. 101—316)

The present invention relates to shoe ornamenting machinery, and more particularly to improvements in combined marking and cutting machines of the type adapted for operation upon skins, upper blanks, fitted and closed uppers, partly fitted uppers and flat work, in which the work is ornamented with an ink or pigment at the same time, or as part of a continuous cycle of operations during which the work is also ornamented by perforating or cutting out a design therein.

Among the improvements in such combined machines is contemplated an organization which is readily adaptable to marking or cutting operations per se, as well as combined operations.

Machines of this nature usually include a work supporting anvil, or its equivalent, upon which the work is placed and aligned with respect to marking and cutting dies, or a combined unit which will be detachably supported in the machine, and also include mechanism providing a relative movement between the work support and dies. In order to insure accurate positioning and aligning of the work on the work support, gauging means are provided in a position bearing a definite relation to the dies and support, whereby the work may be positioned accurately with respect to the dies, when the work support has been moved from an operating position adjacent the die.

It is an important object of the present invention to improve the work support and gauging mechanism.

As an illustration of the type of machine to which the improved work support and gauge are applicable, reference may be made to my co-pending application, Serial No. 612,365, filed May 19th, 1932, which matured into Patent No. 1,971,647, on August 28th, 1934. While the machine of that application is primarily designed for cutting out work and does not include marking mechanism, nevertheless the machine generally is similar in many respects to the present application and readily adaptable to the instant improvements. This invention, in fact, is applicable to various types of ornamenting machines but the preferred embodiment contemplates the combination thereof with a machine utilizing combined marking and cutting out mechanism.

The present improvements are embodied in two modifications; in one there is used a stationary anvil, and associated therewith, a movable combined gauge and work support which carries the work from work placing and aligning position, to operating position and return; the other comprises a movable anvil which includes the work support and gauge mechanism.

Either form can be satisfactorily used for the cutting and marking of fitted uppers, as well as to advantage on partly fitted work or flat work, whereby it may be desirable for the operator to hold the work during cutting and marking operations. While gauge masks are illustrated in connection with both forms, it is obvious that the invention contemplates other types of gauges, such as pin-gauges, solid edge gauges etc., and will operate equally well with various forms of gauge.

The machine comprises generally a base having an upstanding frame secured thereto to support an overhanging head, beneath which is arranged a work support which partakes of movements through a horizontal plane from an inoperative position, convenient to the operator, where the work may be placed on the table, to an operative position beneath the head, there being a plunger reciprocable in the head toward and from the table and to which the dies or die unit are attached.

When the machine is placed in operation, as by treadling a clutch mechanism, or in other desirable manner, the die moves into engagement with the work, marking and cutting it and then returns to its inoperative position. Means are provided which lock and prevent operation of the die, and plunger carrying same, when the work support is in any position other than in an accurately aligned location with respect to the die.

To the attainment of the foregoing and other objects which will appear as the description proceeds, reference may be made to the accompanying drawings, in which:—

Fig. 1 represents a partial side elevation of the machine illustrating one form of improved work support and gauging mechanism;

Fig. 2 is a side elevation of the work support and gauging mechanism removed from the machine;

Fig. 3 is a top plan thereof;

Fig. 4 is a sectional elevation thereof on the line 4—4 of Fig. 2.

Fig. 5 is a view similar to Fig. 1, illustrating a different form of work support and gauging mechanism;

Fig. 8 is a sectional elevation thereof;

Fig. 9 is a section thereof taken on line 9—9 of Fig. 8;

Fig. 10 is a fragmentary sectional detail of a feed mechanism, and

Fig. 11 is a fragmentary elevation of the mechanism shown in Fig. 10.

Figure 6:
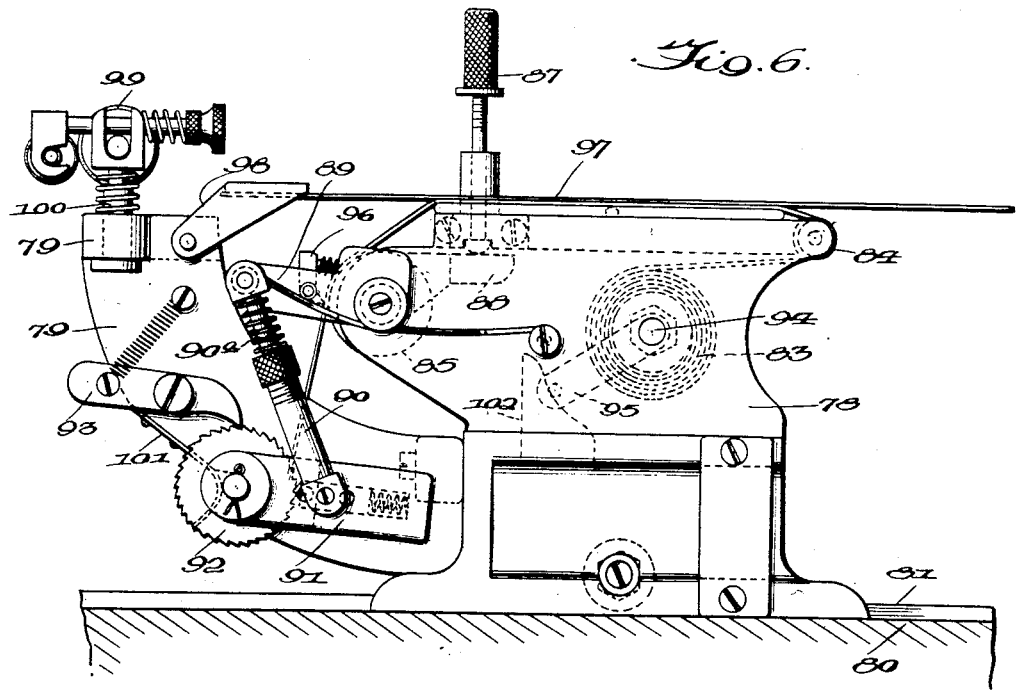
Fig. 6 is a side elevation of the work support and gauging mechanism illustrated in Fig. 5, removed from the machine.

Referring more specifically to the drawings, in which like reference numerals designate like parts, and with particular reference to Figs. 1 to 4, it will be observed that there is provided a machine comprising generally a base portion 15 having an upwardly extending frame or casing portion 16 which terminates in a head portion 17, such head portion overhanging the front part of the base to provide an enclosure within which is positioned an adjustably mounted work supporting anvil 18, usually surfaced with brass or other material softer than the cutting edges of the die.

An adjusting mechanism 19, controlled by thumb screws 20 and 21 is provided to effect both vertical and horizontal adjustments, in a manner similar to that disclosed in my aforementioned copending application. The anvil remains fixed for normal operations.

Mounted for vertical reciprocating movement within the head 17 is a plunger 22 carrying a marking and cutting die unit 23, which latter is aligned with the anvil 18. A constantly driven pulley 24, connected to any convenient source of power serves as a mode of operating the plunger, there being a clutch, (not shown) of the single revolution type, connected thereto and effective to connect the pulley to the mechanism for reciprocating the plunger. A clutch control and latching mechanism indicated generally at 25 (Fig. 1) is provided and a treadle rod 26 connected to a shaft 27 is effective to initiate actuation of the clutch, when released by the control mechanism. When the clutch through depression of the treadle rod connects the pulley 24 to the plunger actuating mechanism for a single revolution of the pulley there will be effected a single complete reciprocation of the plunger 22 and die unit 23 toward and from the work. A safety latching mechanism, hereinafter described, and forming a part of the clutch control mechanism 25 is provided to prevent actuation of the clutch and plunger at other than the proper time in the cycle of operations.

The combined cutting and marking die unit 23 is secured to a die holder or carrier (hereinafter described) by a latching arrangement having a control means 30. The holder is in turn secured to the plunger 22 by means of a similar latching arrangement having a control means 31. The unit itself comprises a base block 32 and a die block 33 which blocks are secured to each other in spaced relation by means of sleeves 34. Cutting elements 35 are rigidly secured to the block 33 and a marking plate 36 is mounted slightly in advance thereof by means of studs 37 which extend through the block 33 into the sleeve 34 and are backed by spring means therein, such that the plate is provided with a yielding or resilient movement relative to the cutting elements. Marking elements 38 are formed on the plate 36, this plate being provided with suitable openings to permit the passage of the cutting elements therethrough as the marking plate engages the work and yields in response to pressure from the plunger.

Details of the unit and latching means form no specific part of the present invention and for a more complete description thereof reference may be made to my aforementioned application and to my copending application Serial No. 679,962, filed July 11th, 1933, which matured into Patent No. 1,990,598, on February 12th, 1935.

Attached to the frame, adjacent the anvil, is a bracket 40 held in place by means of two screws 41. To this bracket are attached two guides 42—42. Formed on the left side of the bracket adjacent a guide is an inverted V-shaped guideway 43 and on the right side a flat slide or guideway 44. Attached to the frame of the machine are stop blocks 45.

An auxiliary work support in the form of a carriage or cage 47 is provided for the purpose of supporting the work over the anvil and for moving the work into and out of an operating position with respect to the die and anvil. This cage 47 is shaped at its forward end to conform generally to the shape of the anvil and projecting horn thereon, and to provide a forwardly projecting tongue or support 48, and when in position for the dies to operate on the work substantially encloses the anvil over its top, front and side portions. Although the cage is illustrated herein with straight sides, it is contemplated that the sides may be shaped to conform to the sides of the anvil. Thus, if the anvil or main work support 18 is shaped to provide clearance spaces for overhanging work at the sides of the support, the cage will of course, be similarly shaped.

The base of the carriage is provided with a pair of guideways one of which, 49, is shaped and positioned to cooperate with the guideway 43 and the other of which, 50, similarly cooperates with the guideway 44. The guides 42 are effective to hold the carriage on the track formed by guideways 43 and 44, while the V-shaped cooperating guideways 43—49 prevent lateral movement thereof. Stop lugs 51 are attached to the sides of the cage in a position to abut the stop blocks 45 as the carriage slides to its innermost position within the frame 16. The upper wall of the carriage usually is formed with an opening 52 of a size and shape to permit passage of the die and marking elements through the top wall of cage toward the anvil 18, during operation of the machine.

Detachably carried by the upper wall of the carriage is a gauging mask 53 having a support or attaching portion 54 which is held in place by a spring clamp 55 and a pair of guide pins 56 which project through cooperating holes in the portion 54. The mask proper is hinged as at 57 to its supporting portion 54. Being detachable, the mask may be removed and another substituted therefor. This is a decided advantage in the handling of various styles and types of work.

The selected mask will be formed with an opening 58 of a predetermined configuration, conforming to a characteristic of the work which is to be ornamented in the machine, and such opening will, when the mask is lowered to engage the work, be substantially superimposed upon the opening 52.

As can be seen from Fig. 3 these openings are not necessarily of the same size or configuration as the opening 52 is designed merely to provide clearance for the die whereas the edges of the opening 58 function as a gauge, and will usually vary with selected masks. When the mask is in its lowered or work engaging position the tongue 48 will act to support same as well as supporting work which will be placed on the cage, beneath the mask.

Rearwardly of the mask clamp 55 will be found the ink applying roller 60, carried by a pair of spring mounted brackets 61 which are respectively fulcrumed on a pair of adjusting screws 62 and beneath which are provided springs 63 tending to hold the roller yieldingly away from the carriage. Immediately adjacent the roller 60 may be placed a distributing or feed roller 64 which, frictionally engaging the roller 60 and rotating under the influence thereof, acts to operate and evenly distribute the marking material over the roller thereby to insure a proper application of such material to the marking die. The roller 64 is preferably carried by adjustable spring mounted brackets 65, a yieldable adjusting mechanism 66 being provided for each bracket whereby the relative pressure between rolls may be varied.

The clutch control and latching mechanism 25 is quite similar to that described in my aforementioned copending application, and includes a spring pressed key 69 which is normally locked in an inoperative position by a sliding bar 70 to prevent actuation of the clutch, should anyone attempt to actuate the treadle link 26 inadvertently, when the carriage is in any position other than beneath the die.

When released by the bar 70 the key will be urged into a position where it will release the clutch for a single revolution, said key being thereafter returned to its original position and again latched.

A lever 71 carried by a sleeve 72 on the shaft 27 is positioned to extend in the path of a lug 73 which is secured to and projects from the side wall of the cage 47. The relative position of the lever 71 and lug 73 is such that the lug engages the end of the lever and just before the carriage reaches its innermost position, and in completing its path of travel inward actuates the lever to rock the sleeve 72. A lever 74 keyed to the sleeve 72, is connected to the latch bar 70, by a lost motion connection at 75, whereby when the shaft is rocked the bar 70 will be moved to release the key 69. The clutch will then connect the pulley 24 to the plunger actuating mechanism. After a single revolution of the clutch, effective to produce a single reciprocation of the plunger, the clutch will release the plunger actuating mechanism. This mechanism is more completely described and disclosed in my aforementioned application.

A backing material, usually in the form of a web of paper 76 is fed from a supply roll (not shown) across the surfaced top of the anvil, over the horn thereof and back through the slotted throat of the anvil by means of feed rollers (not shown), the feed mechanism being so designed as to produce a step by step feed of the paper, in synchronism with the movements of the plunger thus to present a fresh surface after each operation. This paper will pass beneath the openings 52 and 58, its function being to insure a clean operation on the work, and to protect the edges of the cutting die, in a manner similar to the anvil surfacing.

The operation of this form of the invention is as follows. The anvil having been properly adjusted and positioned to accommodate the desired thickness of leather or other material to be ornamented, through the medium of the mechanism 19, the cage or enclosure is fitted thereover, and the machine is then ready for operation with the backing paper feeding inside of the carriage and over the anvil. The carriage is moved outwardly from a position beneath the die, and a work piece laid over the opening 52 and the mask brought down over the work. The work may then be properly positioned by reference to the edges of the opening 58 of the mask, the carriage thereafter being moved inwardly to a position beneath the die. As the carriage moves, the ink roller will contact the elements 38 of the marking plate 36, applying a marking medium thereto.

As the cage or support reaches its inward position the clutch lock will be released by engagement of the lever 71 with lug 73 and the machine is then free for treadling. Treadling of the link 26 will cause an application of power to the plunger which descends and rises, marking the work as well as perforating same.

The clutch then when is locked automatically when the carriage is brought outwardly for the removal of the ornamented work piece and a new piece may then be inserted.

The plunger 22 which carries the die unit, and the mechanism associated with the plunger is comparatively heavy and the mass of the pulley 24 is considerable (the pulley in effect forming a fly wheel) and it will occasionally happen that the inertia of the entire mass is such as to prevent the die from assuming exactly the same position on a return stroke, as it occupied prior to its initial movement. The die should however, always return to the same position so that when the inking roll passes along the marking edges, it will uniformly ink the marking elements 38 successively. Heretofore the nearest approach to a solution of this problem has been by the use of brakes, the effort being to bring the machine to rest with the plunger and die in exactly its original position. Brakes while fairly practical, will not function with the accuracy desired.

The present machine offers a unique solution of the problem in that the die is mounted independently of the plunger, for movement therewith as a unit, and it is therefore feasible to provide means for regulating or adjusting the upward position of the die, irrespective of the position of the plunger.

It will be observed that the die holder or carrier comprises an upper plate 28 latched to the plunger 22 by the control means 31, and a second plate 29, to which the die unit 23 is secured by the control means 30. The two plates are resiliently connected to each other through the yielding telescopic connections 39, whereby it is possible to separate the die from the plunger without detaching same, the connections 39 serving to normally hold the die and plunger in proper relation.

The lever 74 carries an adjusting means 77, illustrated herein as a threaded stud and lock nut, the stud extending through the lever 74 to a position where one end will engage a suitable rigid projection or abutment portion of the machine frame, the housing of the clutch control mechanism 26 being well adapted to this purpose. This stud may be adjusted and locked in any desired position and will serve to limit movement of the lever 74 in one direction, and thereby limit rotary movement of the sleeve 72 in that direction, inasmuch as the lever 74 is keyed to the sleeve. A lever 68, also keyed to the sleeve 72, extends freely into a yoke 46, attached to the die carrying plate 29, the effect being to provide a lost motion connection between the lever and the yoke.

After the cutting and marking operation, the connections 39 will raise the die along with the plunger until the stud of the adjusting means 77 strikes the projection or abutment on the frame. It will therefore be seen that by adjusting the stud the die can be raised to any desirable height to accord with adjustments of the ink roll. This adjustment will be so made that when the plate 29 is in its uppermost position there will be some space between the plate 29 and the plate 28, which is attached to the plunger 22, whereby the die will always return to its exact original position, determined by the adjusting means 77 and regardless of the exact position to which the plunger may return. It is important that the die always return to its exact original position, inasmuch as the marking element will be treated with ink or other suitable marking medium when in such original position.

It will be observed that the cage or support is rather light in construction and therefore is readily and easily movable by an operator from work placing to work cutting and marking position. Also the cage carries the inking mechanism so that when it is moving, it inks the marking die; it also carries the gauge or mask which is detachably mounted thereon, allowing for the interchange of various masks or other type of gauge. This cage can be made in different widths or sizes, corresponding to the size of the anvil with which it is used. Not an unimportant advantage in the use of the sliding carriage, resides in the fact that it permits use of a stationary anvil of a type now in use together with backing material which is usually fed across the top surface of the anvil, and as a consequence machines now on the market, with a few slight changes, could be equipped with this cage, and used not only for cutout work but for both marking and cutting out.

Figure 7:
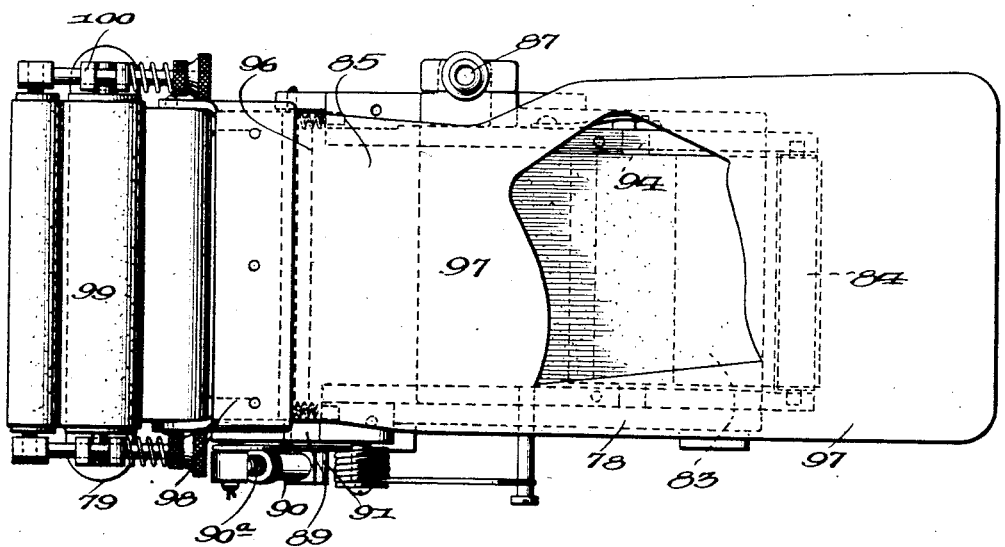
Fig. 7 is a top plan view thereof.

Referring now to Figs. 5 to 10 there is disclosed a slightly modified form of the invention, wherein the stationary or fixed anvil 18 is omitted and in its place there is substituted a flat plate 80 which is bolted securely into the frame of the machine.

A work supporting anvil 78 is mounted for sliding movement on the plate, this anvil having a track or guide 82 formed in the base to cooperate with the guide 81 on the plate 80.

In this form of invention the conventional feed of backing material may be omitted, the sliding anvil being arranged to carry a supply roll of paper 83, the web of paper being fed over a roller 84 and past the feed roll 85 to a take-up roll 86. A projecting stud 87 extends from the side of the machine toward the plunger 17 and in the path of movement thereof. When engaged by the plunger and forced downwardly, the plunger strikes a crank arm 88 keyed to the shaft of the feed roll 85 and causing a partial rotation thereof. On the opposite side of the anvil is a second crank arm 89 also keyed to the shaft of the feed roll 85 and having an end connected to a telescopic link 90 which in turn is connected by a link 91 to a ratchet 92. The ratchet 92 is keyed to the shaft of the take-up roll 86 and is engaged by a pawl 93 pivoted on the rear of the anvil housing. A spring 90a connects the parts of the telescopic link 90, normally holding them against separation, and returning them after expansion under the influence of crank 89. Suitable spring means are likewise provided for the pawl and the various links, to return the several parts of the ratchet mechanism to normal position after an operation thereof.

A spring mounted transverse bar 96 is placed opposite the feed roller 85, to hold the web of paper firmly thereagainst. It will be obvious that each downward movement of the stud 87 will actuate the ratchet mechanism such that a return movement thereof will effect a feed of the paper web from the supply 83 to the take-up 86, the bar 96 being formed with a tapered edge bent inwardly toward the web, to prevent retrograde movement thereof.

A gauge mask 97 similar to the gauge mask 53 in hingedly mounted by a supporting bracket 98 to the upwardly extending frame portion or bracket arm 79 of the anvil, and this frame portion also carries an inking mechanism designated generally at 99 which is similar to the mechanism 60 above described, with the exception that instead of being mounted on a pair of fulcrum levers the mechanism is desirably carried by a pair of spring studs 100 which permit a slight yielding toward the frame as the roller contacts the die. Adjustments may be effected just as in the mechanism 60.

The shaft 94 of the supply roll is removable, being normally held in place by a leaf spring 95 on the side of the anvil. This permits a ready removal and replacement of the roll 83. The ends of the shaft carrying the take-up roll are carried by notches in the rear of the frame portion 79 and held in place by leaf springs 101, which facilitates ready removal and replacement thereof.

Mounted on the side of the base of the anvil is a lug 102, same being positioned to engage the lever 71 as the anvil travels inwardly to release the clutch lock mechanism in the manner described in connection with the lug 73.

Stop lugs 103 carried by the base of the anvil are arranged to abut a portion of the main frame 16 at 104 to limit inward movement of the anvil.

The operation of this form of invention will be readily understood from the foregoing description, the combination between the sliding anvil and the machine proper, being exactly the same as in the case of the cage, the anvil being manually movable from a position beneath the die, outwardly to permit placement of work thereon, and inwardly to a position where the lug 102 will engage the arm 71 to effect a control of the clutch and power mechanism. The same type of work and the same results are obtained by either modification, and the only change necessary in the sliding anvil form, to convert a machine now in use by this modification, is the removal of the auxiliary anvil and the substitution therefor of the bracket or plate 80 with the slidable anvil thereon. Of course, the conventional paper feed for a stationary anvil will be discontinued in favor of the self-contained unit.

Having thus described my invention, what I claim as new and desire to secure by Letters Patent of the United States, is:—

1. An ornamenting machine comprising a frame, a stationary work support therein, and upon which an ornamenting operation may be performed, an ornamenting die unit movably mounted in said frame, means to move said unit relative to said support, an auxiliary work support conforming generally to the shape of said fixed work support, and means mounting said auxiliary support for movement from a position in alignment with said unit and substantially enclosing said stationary support, to an inoperative position away from said unit and said stationary support.

2. An ornamenting machine for operating upon ring-like work comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, both of said supports being shaped to provide a substantially flat surface for receiving a portion of the work to be ornamented, and shaped to provide clearance space at the sides of and beneath said flat surface thereby to accommodate overhanging portions of the work and prevent buckling of the portion of the work on the flat surface, and means mounting said auxiliary support for movement from a position in alignment with said unit and substantially enclosing said stationary support, to an inoperative position away from said unit and stationary support.

3. An ornamenting machine comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, and having an extending horn for the reception of a work piece to be ornamented, and means mounting said auxiliary support for movement from a position in alignment with said unit and substantially enclosing said stationary support, to an inoperative position away from said unit and said stationary support.

4. An ornamenting machine comprising a frame, a stationary work support upon which an ornamenting operation may be performed, an ornamenting die unit movably mounted in said frame, means to move said unit relative to said support, a hollow auxiliary work support conforming generally to the shape of said fixed work support, and guideways extending from the base of said stationary support, said auxiliary support having guides cooperative with said guideways whereby said auxiliary support may be moved to an inoperative position away from said stationary support and back.

5. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substantially enclosing said stationary support to an inoperative position away from said unit and said stationary support, and means carried by said auxiliary support to align and locate a work piece thereon with respect to said die unit.

6. A machine for ornamenting shoe parts comprising a frame, a stationary work support therein, and upon which an ornamenting operation may be performed, an ornamenting die unit movably mounted in said frame, means to move said unit relative to said support, an auxiliary work support conforming generally to the shape of said fixed work support, means mounting said auxiliary support for movement from a position in alignment with said unit and substantially enclosing said stationary support to an inoperative position away from said unit and said stationary support, and quickly detachable means carried by said auxiliary support to align and locate a work piece thereon with respect to said die unit.

7. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substantially enclosing said stationary support to an inoperative position away from said unit and said stationary support, and means carried by said auxiliary support to apply a marking medium to said die unit during movement of said support.

8. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, and an adjustably and resiliently mounted inking roll mechanism carried by said auxiliary support to apply a marking medium to said die unit during movement of said support.

9. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substantially enclosing said stationary support, to an inoperative position away from said unit and said stationary support, means carried by said auxiliary support to align and locate a work piece thereon, with respect to said die unit, and means also mounted on said auxiliary support to apply a marking medium to said die unit during movement of said support.

10. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substantially enclosing said stationary support to an inoperative position away from said unit and said stationary support, a supply of backing material for said die unit, carried by said frame, and means to feed said backing material over said stationary support and under said auxiliary support.

11. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substatially enclosing said stationary support to an inoperative position away from said unit and said stationary support, a supply of backing material for said die unit, carried by said frame, means to feed said backing material over said stationary support and under said auxiliary support, said auxiliary support being provided with an opening permitting passage of the die unit therethrough and into engagement with said backing material.

12. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position, in alignment with said unit and substantially enclosing said stationary support to an inoperative position away from said unit and said stationary support, a gage mask hingedly connected to said auxiliary work support to align and locate a work piece thereon with respect to said die unit, said auxiliary support being provided with an opening permitting passage of the die unit therethrough, and said mask being provided with an opening substantially coincident with the opening in said support, and having a shape conforming to a predetermined characteristic of the work piece whereby the work piece may be properly aligned on the support.

13. A machine for ornamenting shoe parts comprising a frame, a stationary work support therein, and upon which an ornamenting operation may be performed, an ornamenting die unit movably mounted in said frame, means to move said unit relative to said support, a hollow auxiliary work support conforming generally to the shape of said fixed work support, means mounting said auxiliary support for movement from a position in alignment with said unit and substantially enclosing said stationary support, to an inoperative position away from said unit and said stationary support, a gage mask hingedly connected to said auxiliary work support to align and locate a work piece thereon, a supply of backing material for said die unit, carried by said frame, means to feed said backing material over said stationary support and under said auxiliary support, said auxiliary support being provided with an opening permitting passage of the die unit therethrough and into engagement with said backing material, and said mask being provided with an opening located to register with the opening in said support, said mask opening having a shape conforming to a predetermined characteristic of the work piece whereby the work piece may be properly aligned on the support.

14. An ornamenting machine comprising, a frame, a movable work support therein, a plunger reciprocable in said frame toward and from said support, means to actuate said plunger, a die unit, means mounting said die unit on said plunger for movement relative to and with said plunger, means to limit movement of said unit regardless of the extent of movement of said plunger, and means mounting said support for movement, during a normal cycle of operations of the machine, from a position in alignment with said die unit to an inoperative position spaced laterally therefrom.

15. An ornamenting machine comprising a frame, a work support therein, means mounting said work support for lateral movement, during a normal cycle of operations of the machine, a plunger reciprocable in said frame toward and from said support, means to actuate said plunger, a die unit, means mounting said die unit on said plunger for movement relative to and with said plunger, means to limit movement of said unit regardless of the extent of movement of said plunger, comprising a control arm, adjustable means to predetermine the normal position of such arm, and a connection between said unit mounting means and said control arm.

16. An ornamenting machine comprising a frame, a work support therein, means mounting said work support for lateral movement, during a normal cycle of operations of the machine, a plunger reciprocable in said frame toward and from said support, means to actuate said plunger, a die unit, means mounting said die unit on said plunger for movement relative to and with said plunger, comprising a plate rigidly connected to said plunger, a second plate rigidly connected to said unit, and resilient means connecting the plates to each other, means to limit movement of said unit regardless of the extent of movement of said plunger comprising a control arm, adjustable means to predetermine the normal position of such arm and a connection between said unit mounting means and said control arm.

17. An ornamenting machine comprising a frame, a work support therein, means mounting said work support for lateral movement, during a normal cycle of operations of the machine, a plunger reciprocable in said frame toward and from said support, means to actuate said plunger, a die unit, means mounting said die unit on said plunger for movement relative to and with said plunger, comprising a plate rigidly connected to said plunger, a second plate rigidly connected to said unit, and resilient means connecting the plates to each other, means to limit movement of said unit regardless of the extent of movement of said plunger, comprising a control arm, adjustable means to predetermine the normal position of such arm, and a lost motion connection between the die carrying plate and said control arm, and a connection between said unit mounting means and said control arm.

18. An ornamenting machine comprising a frame, an ornamenting die unit carried by said frame, a work support mounted for lateral movement with respect to said die unit, means to move said die unit vertically with respect to said support, means carried by said support to supply backing material for said die unit, means to feed said backing material from a source of supply over the working surface of said support, and means carried by said support to take-up said backing material.

19. An ornamenting machine comprising a frame, an ornamenting die unit movably mounted in said frame, a work support mounted for lateral movement with respect to said die unit, means to move said die vertically with respect to said support, means carried by said support to supply backing material for said die unit, means to feed said backing material from a source of supply over the working surface of said support, means carried by said support to take-up said backing material, and means carried by said support to apply a marking material to said die unit during movement of said support.

20. An ornamenting machine comprising a frame, an ornamenting die unit movably mounted in said frame, a work support mounted for lateral movement with respect to said die unit, means to move said die unit vertically with respect to said support, means carried by said support to supply backing material for said die unit, means to feed said backing material from a source of supply over the working surface of said support, means carried by said support to take up said backing material, and means engageable by said plunger during movement thereof to effect an intermittent feed of said backing material.

21. An ornamenting machine comprising a frame, an ornamenting die unit movably mounted in said frame, a work support mounted for lateral movement with respect to said die unit, means to move said die unit vertically with respect to said support, means carried by said support to supply backing material for said die unit, means to feed said backing material from a source of supply over the working surface of said support, means carried by said support to take up said backing material, and means carried by said support to align and properly locate a work piece on said support with respect to said die unit.

22. In an ornamenting machine, the combination with a bed and a pressure applying member, a work supporting member, a die unit having a cutting edge and an ink marking element interposed between the members, said members being relatively movable to cause the cutting edge and marking elements to engage a work piece on said support, and means for protecting the cutting edge of the unit, comprising a strip of flexible material interposed between the die unit and the face of one of the members, and means carried by said member and engageable by the other member to intermittently move said strip across the surface of its respective member.

23. A work support for ornamenting machines comprising a hollow carriage member having an anvil conformation terminating in a projecting horn effective to support ring-like work, a detachable gauge mask carried above the operating surface of said support and effective to properly locate a work piece on said support, and an ink roll resiliently mounted on said support adjacent the rear end of said mask.

24. A work support for ornamenting machines comprising an anvil, a detachable gauge mask carried above the operating surface of said support and effective to properly locate a work piece on said support, and an ink roll resiliently mounted on said support adjacent the rear end of said mask, a strip of flexible material superimposed on said operating surface and between said surface and said mask, and means supported by said anvil for moving said strip intermittently over said surface.

25. An ornamenting machine comprising a frame, a work support therein, means mounting said support for lateral movement, during a normal cycle of operations of the machine, a plunger reciprocable in said frame toward and from said support, means to actuate said plunger, a die unit, means mounting said die unit on said plunger for movement relative to and with said plunger, and means to limit movement of said unit regardless of the extent of movement of said plunger.

26. An ornamenting machine comprising a frame, a work support therein, means mounting said support for lateral movement, a plunger reciprocable in said frame toward and from said support, means to actuate said plunger, a die unit, means mounting said die unit on said plunger for movement relative to and with said plunger, means to limit movement of said unit regardless of the extent of movement of said plunger, and means to lock said plunger actuating means against movement until said work support is positioned in alignment with said die unit, a control finger extending from said locking means into the path of movement of said support, said control finger being connected to positively actuate said locking means, and means on said support engageable with said finger as the support moves into a position of alignment with the die.

27. An ornamenting machine comprising a frame, a work support carried thereby, a plunger reciprocable in said frame toward and from said support, means to actuate said plunger, a die unit including a marking element, said unit being mounted for movement relative to and with said plunger, means to limit movement of said unit regardless of the extent of movement of said plunger, and means for applying a marking medium to said marking element when said unit has reached its limit of movement.

28. An ornamenting machine comprising a frame, a work support carried thereby, a plunger reciprocable in said frame toward and from said support, means to actuate said plunger, a die unit including a marking element, said unit being mounted for movement relative to and with said plunger, means to limit movement of said unit regardless of the extent of movement of said plunger and to locate said unit in a predetermined position, whereby a marking medium may be applied to said unit.

BENJAMIN W. FREEMAN.